United States Patent [19]
Dewprashad et al.

[11] Patent Number: 6,016,870
[45] Date of Patent: Jan. 25, 2000

[54] COMPOSITIONS AND METHODS FOR CONSOLIDATING UNCONSOLIDATED SUBTERRANEAN ZONES

[75] Inventors: Brahmadeo T. Dewprashad, Lawton; Philip D. Nguyen; Kirk L. Schreiner, both of Duncan, all of Okla.

[73] Assignee: Halliburton Energy Services, Inc., Duncan, Okla.

[21] Appl. No.: 09/095,869

[22] Filed: Jun. 11, 1998

[51] Int. Cl.⁷ ..................................................... E21B 33/38
[52] U.S. Cl. ........................................... 166/295; 166/276
[58] Field of Search .................................. 166/295, 276, 166/278, 281, 285, 294

[56] References Cited

U.S. PATENT DOCUMENTS

| | | | |
|---|---|---|---|
| 3,646,999 | 3/1972 | Hamby, Jr. et al. | 166/281 |
| 3,747,678 | 7/1973 | Waid | 166/295 |
| 4,072,194 | 2/1978 | Cole et al. | 166/295 |
| 4,085,802 | 4/1978 | Sifferman et al. | 166/295 |
| 4,110,275 | 8/1978 | Sifferman et al. | 166/295 X |
| 4,272,384 | 6/1981 | Martin | 252/8.55 R |
| 4,291,766 | 9/1981 | Davies et al. | 166/276 |
| 4,483,888 | 11/1984 | Wu | 427/336 |
| 5,129,458 | 7/1992 | King et al. | 166/295 |
| 5,314,023 | 5/1994 | Dartez et al. | 166/295 |
| 5,368,102 | 11/1994 | Dewprashad et al. | 166/276 |
| 5,547,027 | 8/1996 | Chan et al. | 166/295 |
| 5,609,207 | 3/1997 | Dewprashad et al. | 166/276 |
| 5,791,415 | 8/1998 | Nguyen et al. | 166/280 |

*Primary Examiner*—Frank S. Tsay
*Attorney, Agent, or Firm*—Robert A. Kent; C. Clark Dougherty, Jr.

[57] ABSTRACT

The present invention relates to improved methods and compositions for consolidating unconsolidated subterranean zones. The compositions of the invention are low viscosity hardenable epoxy resin compositions which are basically comprised of an epoxy resin, a N-methyl-2-pyrrolidone diluent and an effective amount of a hardening agent.

24 Claims, No Drawings

COMPOSITIONS AND METHODS FOR CONSOLIDATING UNCONSOLIDATED SUBTERRANEAN ZONES

BACKGROUND OF THE INVENTION

1. Field of the Invention.

The present invention relates to improved methods and compositions for consolidating unconsolidated subterranean zones, and more particularly, to improved low viscosity hardenable epoxy resin compositions and methods for consolidating unconsolidated subterranean producing zones.

2. Description of the Prior Art.

Oil and gas wells are often completed in unconsolidated producing zones containing loose and incompetent sands which migrate with oil, gas and/or water produced by the wells. The presence of sand in the produced fluids is disadvantageous and undesirable in that the sand particles abrade pumping and other producing equipment and reduce the fluid production capabilities of the producing zones. Unconsolidated subterranean zones include those which contain loose sands that are readily entrained by produced fluids and those wherein the sand particles making up the zone are bonded together with insufficient bond strength to withstand the forces produced by the production of fluids through the zones.

Heretofore, unconsolidated subterranean producing zones have been consolidated into hard permeable masses by injecting a hardenable resin composition into the zones followed by an afterflush solution to remove excess resin from the pore spaces of the zones. Often, to insure that sand is not produced as a result of the consolidated zones having insufficient strengths to maintain their integrity, costly gravel packs have been installed in the well bores penetrating the zones. The gravel packs function to filter out sand from the fluids being produced.

An alternate technique which has recently been developed and used involves consolidating an unconsolidated zone by injecting a hardenable resin composition in the portion of the zone surrounding the well bore followed by an afterflush solution whereby the portion of zone surrounding the well bore is consolidated into a hard permeable mass. Thereafter, at least one fracture is created in the zone extending from the well bore through the consolidated portion of the zone into an unconsolidated portion thereof. A hardenable resin composition coated proppant is deposited in the fracture and the resin composition is caused to harden whereby the proppant is consolidated into a hard permeable mass which filters out and prevents the migration of formation sands with fluids produced through the fracture into the well bore. However, since the presence of the filtered sand adds to the resistance to the flow of fluids through the fracture and through the consolidated portion of the zone surrounding the well bore, additional pressure drawdown takes place which can cause the consolidated portion of the zone and proppant in the fracture to breakdown and to be bypassed.

In wells containing long producing intervals in unconsolidated zones, permeability variations in the zones through which the well bores extend are often encountered. As a result, leakoff of the hardenable resin composition to the more permeable parts of the zones often leaves the lower permeability parts untreated. This, in turn, allows the continued migration of loose and incompetent sands with fluids produced from the zones.

Thus, there are needs for improved hardenable resin compositions and methods whereby the compositions have high strengths upon hardening and have other improved properties for consolidating unconsolidated subterranean producing zones without the necessity of also installing costly gravel packs or the like. Further, in long producing interval applications, such improved hardenable resin compositions should include subsequently removable particulate solid diverting agents for diverting the resin compositions from highly permeable portions of the intervals to the less permeable portions.

SUMMARY OF THE INVENTION

The present invention provides improved hardenable resin compositions and methods for consolidating unconsolidated subterranean producing zones which meet the needs described above and overcome the deficiencies of the prior art. The improved resin compositions of this invention are low viscosity hardenable epoxy resin compositions basically comprised of an epoxy resin, a diluent comprised of N-methyl-2-pyrrolidone and an effective amount of a hardening agent. The compositions preferably also include a resin-to-sand coupling agent.

The improved methods of this invention are utilized for consolidating an unconsolidated subterranean zone penetrated by a well bore to thereby prevent the migration of loose and incompetent sands with fluids produced from the zone. The methods basically comprise the steps of introducing a low viscosity hardenable epoxy resin composition of this invention into the zone whereby the loose and incompetent sands therein are coated with the resin composition and then introducing an afterflush solution into the zone to remove excess resin composition from the pore spaces in the zone.

When the compositions and methods of this invention are utilized to consolidate long interval unconsolidated subterranean zones, a particulate solid diverting agent is preferably included in the composition utilized which can subsequently be removed from the zone. Examples of such diverting agents include, but are not limited to, acid dissolvable polymer particulate, water dissolvable salt particulate and oil soluble resin particulate. Most preferably, the diverting agent is particulate solid foamed starch which is removed from the treated zone by dissolution in an aqueous afterflush solution.

It is, therefore, a general object of the present invention to provide improved compositions and methods for consolidating unconsolidated subterranean zones.

Other and further objects, features and advantages of the present invention will be readily apparent to those skilled in the art upon a reading of the description of preferred embodiments which follows.

DESCRIPTION OF PREFERRED EMBODIMENTS

The present invention provides improved hardenable compositions and methods for consolidating unconsolidated subterranean zones penetrated by cased or open hole well bores thereby preventing the migration of loose and incompetent sands with fluids produced from the zones. The compositions and methods eliminate the necessity of installing expensive gravel packs, sand screens and the like.

The hardenable compositions of this invention have high strengths and flexibility after hardening. In addition, the compositions have a variety of other improved properties including low viscosity, the ability to coat unconsolidated subterranean zones in the presence of formation fluids, a slow cure rate, and the use of an external catalyst is not required. In addition, the compositions do not prematurely harden in acid environments making the use of solid diverting agents removable by contact with acid afterflush solutions possible. The slow cure rates of the improved compositions insures that the compositions will not prematurely harden at high down-hole temperature conditions.

The improved low viscosity hardenable compositions of this invention are basically comprised of an epoxy resin, a diluent comprised of N-methyl-2-pyrrolidone present in the composition in an amount sufficient to lower the viscosity thereof to within the range of from about 1 to about 100 centipoises and an effective amount of a hardening agent.

The epoxy resins which are particularly suitable for use in accordance with the present invention are multifunctional polyepoxide resins having three or more reactive groups per resin molecule. Further the epoxy resins used in the present invention will preferably have epoxide equivalent weights in the range of from about 90 to about 300. The epoxide equivalent weight of an epoxy resin is determined by dividing the molecular weight of the epoxy resin by the number of epoxide groups contained in each molecule of the epoxy resin. Examples of epoxy resins preferred for use in the present invention include: the diglycidyl ethers of bisphenol-A; the diglycidyl ethers of bisphenol-F; the glycidyl ethers of aminophenols; the glycidyl ethers of methylenedianiline;and epoxy novalac resins. A preferred liquid epoxy resin is a multi-functional epoxy novolac resin. Such a liquid epoxy resin is commercially available under the tradename "EPI-REZ SU2.5" available from Rhone-Poulenc or from various custom manufacturers.

The epoxy resin utilized is generally included in an epoxy resin composition of this invention in an amount in the range of from about 5% to about 80% by weight of the composition, preferably in an amount in the range of from about 30% to about 50%, and most preferably in an amount of about 40%.

A variety of liquid diluents have heretofore been utilized to lower the viscosity of epoxy resins of the types described above, e.g., aromatic hydrocarbon diluents. While such diluents function effectively in epoxy resin compositions, they are very expensive. By the present invention, a relatively inexpensive diluent is used comprised of N-methyl-2-pyrrolidone. N-methyl-2-pyrrolidone functions well as a diluent for epoxy resins and does not change the sand coating efficiency of the resin or its ability to consolidate sand. In addition, N-methyl-2-pyrrolidone is water soluble which allows it to be dissolved out of the resin composition by the aqueous afterflush solution and formation fluids thereby improving the strength of the hardened resin composition.

The N-methyl-2-pyrrolidone diluent is included in an epoxy resin composition of this invention in an amount sufficient to lower the viscosity thereof to within the range of from about 1 to about 100 centipoises. To obtain the foregoing viscosity levels, the N-methyl-2-pyrrolidone diluent is generally combined with an epoxy resin of the type described above in an amount in the range of from about 25% to about 150% by weight of the epoxy resin composition, preferably in an amount in the range of from about 80% to about 125%, most preferably about 115%.

An effective amount of a hardening agent for causing the epoxy resin composition to harden after it has been pumped into an unconsolidated subterranean zone is also included in the epoxy resin composition. While a variety of hardening agents can be utilized, an aromatic amine hardening agent is preferred for use in accordance with the present invention in that it causes the epoxy resin composition to harden slowly over a period of time in the range of from about 10 to about 48 hours. This allows the epoxy resin composition to be displaced from the pore spaces of a coated sand pack by an afterflush solution before hardening occurs at the high well bore temperatures encountered. Preferred such aromatic amine hardening agents are one or more hardening agents selected from the group of 4,4-diaminodiphenylsulfone, 3,3-diamino-diphenylsulfone and methylenedianiline. Of these, 4,4-diaminodiphenylsulfone is the most preferred.

The hardening agent is generally included in an epoxy resin composition of this invention in an amount in the range of from about 10% to about 80% by weight of the composition, more preferably in an amount of about 10% to about 55%, and most preferably in an amount of 15%.

The epoxy resin compositions of this invention also preferably include a resin-to-sand coupling agent. Examples of such resin-to-sand coupling agents include, but are not limited to, gamma-glycidoxypropyltrimethoxysilane, gamma-glycidoxymethyltriethoxysilane and N-beta-aminoethyl-gamma-aminopropyltrimethoxysilane. Of these, N-beta-aminoethyl-gamma-aminopropyltrimethoxysilane is preferred. When used, the resin-to-sand coupling agent is included in an epoxy resin composition of this invention in the general amount of from about 0.1% to about 10% by weight of the composition, more preferably in an amount in the range of from about 0.1% to about 5%, and most preferably in an amount of about 1%.

When a composition of this invention is utilized in a long producing interval in an unconsolidated subterranean zone which has varying permeability, the epoxy resin composition preferably includes a particulate solid diverting agent which can subsequently be removed from the zone by dissolution in the afterflush solution utilized. The diverting agent functions to reduce the flow of the resin composition into high permeability areas and thereby divert portions of the resin composition into low permeability areas whereby the entire unconsolidated interval is treated.

Examples of particulate solid diverting agents which can be utilized are aqueous acid solution soluble particulate gels such as gelled aqueous hydroxyethylcellulose. A preferred diverting agent for use in accordance with this invention is particulate solid foamed starch which can be dissolved in aqueous afterflush solutions. When used, a particulate solid diverting agent is included in an epoxy resin composition of this invention in the general amount in the range of from about 0.1% to about 20% by weight of the composition.

A particularly preferred low viscosity hardenable epoxy resin composition of this invention for consolidating an unconsolidated subterranean producing zone penetrated by a well bore is comprised of an epoxy resin formed of an epoxy novalac resin having an epoxide equivalent weight in the range of from about 90 to about 300 present in an amount of from about 30% to about 50% by weight of the composition; a diluent comprised of N-methyl-2-pyrrolidone present in an amount in the range of from about 80% to about 125% by weight of the composition; a hardening agent comprised of 4,4-diaminodiphenylsulfone present in an amount in the range of from about 40% to about 55% by weight of the composition; and a resin-to-sand coupling agent comprised of N-beta-aminoethyl-gamma-aminopropyltrimethoxysilane present in an amount in the range of from about 0.1% to about 5% by weight of the composition.

In accordance with the methods of this invention, an unconsolidated subterranean zone penetrated by a well bore is consolidated with an epoxy resin composition of this invention to thereby prevent the migration of loose and incompetent sands with fluids produced from the zone. The methods of the invention basically comprise the steps of introducing a low viscosity hardenable epoxy resin composition of this invention as described above into the zone whereby loose and incompetent sands in the zone are coated with the resin composition. As mentioned, if a long interval in the unconsolidated subterranean zone is treated and the zone is of varying permeability, a particulate solid diverting agent which is soluble in the afterflush solution used is included in the epoxy resin composition. After the sands in the subterranean zone have been coated with the resin composition, an afterflush solution is introduced into the zone to remove excess resin composition from the pore spaces of the zone and to dissolve the particulate solid diverting agent (if used). Thereafter, the resin coated sand in the subterranean zone is allowed to harden.

As mentioned above, the particulate diverting agent is preferably particulate solid foamed starch and the afterflush solution is preferably an aqueous salt solution such as brine. A preflush solution can optionally be introduced into the unconsolidated zone prior to introducing the epoxy resin composition therein to displace formation fluids from the portion of the zone around the well bore and condition the loose and incompetent sands therein. When used, the preflush solution is preferably an aqueous salt solution.

After the loose and incompetent sands in the subterranean zone are consolidated as described above, the consolidated zone can be fractured and propped with consolidated propping agent using procedures which are well known to those skilled in the art.

Surprisingly, it has been found that it is not necessary to permit the resin composition to harden prior to a fracturing treatment. After the resin composition has been flushed from the well bore tubing and the pore spaces of the immediately surrounding well bore, a hydraulic fracturing treatment may be immediately performed using a viscous gelled fluid. If desired a propping agent may be introduced with the fracturing fluid. The fracturing fluid may comprise substantially any of the conventionally known fracturing fluids with the various known additives so long as it does not adversely effect the resin composition which has been coated upon the formation sands. For example, the fracturing fluid may comprise either a linear or crosslinked aqueous gel or foamed gelled fluid. The fracturing fluid is introduced through the well bore in a convention manner at a rate and pressure sufficient to create at least one fracture in the subterranean formation. The fracture is found to readily propagate through the resin treated zone and into the subterranean formation without effecting the consolidation surrounding the well bore. Combining resin consolidation of the near well bore with hydraulic fracturing in higher permeability formations provides a solution to well completion that achieves a negative or zero skin at the well bore. The hydraulic fracture provides a highly permeable conduit to connect the untreated unconsolidated formation to the well bore without permeability loss at the consolidated formation wall. Preferably, the proppant introduced into the created fracture is at least partially coated with a liquid resin system to prevent subsequent proppant flowback. The resin composition of the present invention may be used to coat the introduced proppant or compositions of the type disclosed in U.S. Pat. Nos. 4,829,100 and 5,232,961 may be applied in the manner described therein, the entire disclosures of which are incorporated herein by reference. Alternatively, a tackifying compound of the type described in U.S. patent application Ser. Nos. 08/725,368 filed Oct. 3, 1996, 08/783,050 filed Jan. 14, 1997, or 08/800,432 filed Feb. 18, 1997 each entitled "Control Of Particulate Flowback In Subterranean Wells" and the methods described therein which are incorporated herein by reference may be utilized to minimize proppant flowback during subsequent hydrocarbon production from the subterranean formation.

In order to further illustrate the compositions and methods of this invention, the following examples are given.

EXAMPLE 1

An epoxy resin composition of this invention was prepared comprised of 35 milliliters of a multi-functional epoxy novolac resin, 48.7 milliliters of N-methyl-2-pyrrolidone diluent, 3.5 milliliters of butyl lactate, 41.0 milliliters of 4,4-diaminodiphenylsulfone hardening agent and 1 milliliter of N-beta-aminoethyl-gamma-aminopropyltrimethoxysilane coupling agent. A salt solution was prepared for use as a preflush and afterflush comprised of 1000 milliliters of fresh water, 150 grams of sodium chloride and 2 milliliters of an alkyl phosphonate surfactant.

A 1000 gram sand pack of Oklahoma number 1 sand was treated with a preflush of 20 milliliters of the above described brine solution followed by 20 milliliters of kerosene which was in turn followed by a second 20 milliliters of brine solution. The sand pack was then treated with 20 milliliters of resin solution followed by an afterflush of 40 milliliters of the brine solution. The sand pack was then cured overnight at 200° F.

The cured sand pack was tested for 24 hour compressive strength at 75° F. and for regained permeability in accordance with conventional procedures. The compressive strength of the sand pack was 700 psi and it had a regained permeability of 80%. An SEM scan of the consolidated pack showed that the sand grains were uniformly coated and the pore spaces were free of resin. The remaining unused resin composition was added to an equal volume of a 5% aqueous hydrochloric acid solution and the mixture was allowed to sit overnight. The resin composition remained as a thin liquid in the presence of the acid solution. In contrast, a furan resin composition mixed with the same strength aqueous acid solution hardened on contact.

EXAMPLE 2

An epoxy resin composition of this invention was prepared comprised of 105 milliliters of a multi-functional epoxy novolac resin, 105 milliliters of N-methyl-2-pyrrolidone diluent, 10.5 milliliters of butyl lactate, 123 milliliters of 4,4-diaminodiphenylsulfone hardening agent and 3 milliliters of N-beta-aminoethyl-gamma-aminopropyltrimeth-oxysilane coupling agent. A salt solution was prepared for use as a preflush and afterflush comprised of 1000 milliliters of fresh water, 50 grams of potassium chloride and 2 milliliters of an alkyl phosphonate surfactant.

Cores of sand packs having various mesh sizes were consolidated with the above described resin composition to determine the compressive strengths of the resulting consolidations. The results of these compressive strength tests are given in Table I below.

TABLE I

COMPRESSIVE STRENGTH TESTS

| Core Sand Mesh[1] Size and Composition | Compressive Strength, psi |
|---|---|
| 100% 40/70 Mesh Sand | 5,345 |
| 100% 70/170 Mesh Sand | 5,020 |
| 88% 40/70 Mesh Sand; 10% 70/170 Mesh Sand; and 2% Bentonite | 2,165 |

[1]U.S. Sieve Series

From Table I it can be seen that the cores consolidated with the epoxy resin composition of the present invention had excellent compressive strengths.

EXAMPLE 3

A section of steel tubing having a length of 9 inches, a ¾ inch outside diameter and a ⅝ inch inside diameter was used to simulate a well bore. A 4 inch center section of the tubing was drilled with ⅛ inch holes to simulate perforations. The resulting perforated tube was connected to a ¼ inch stainless steel tubing for injecting fluids into the simulated well bore.

An unconsolidated sand pack was packed around the simulated well bore within a copper box having dimensions of 6 inches×6 inches×12 inches. The sand pack included 88% Oklahoma No. 1 sand (70/140 U.S. mesh), 10% silica flour and 2% bentonite. After mixing the sand pack had an average permeability of 75 md.

A 420 milliliter portion of the salt solution described in EXAMPLE 2 was injected into the simulated well bore and into the sand pack at a rate of 15 milliliters per minute (a 2 psi pump pressure) as a preflush. A 175 milliliter portion of the epoxy resin composition described in EXAMPLE 2 was then pumped into the simulated well bore and into the sand pack at a rate of about 19 milliliters per minute (a 14 psi pump pressure). Thereafter, 115 milliliters of the brine solution was injected into the simulated well bore and into the sand pack at a rate of 18 milliliters per minute (a 10 psi pump pressure) to simulate an afterflush. The treated sand pack was then placed in an oven and cured at 250° F. for 24 hours. The cured sand pack was placed in a press whereby the over burden stress exerted on the sand pack was 400 psi. A maximum horizontal stress was exerted on the sand pack in a first direction at 200 psi with a minimum horizontal stress being exerted at right angles to the first horizontal stress. The sand pack was then fractured by injecting an aqueous hydroxyethylcellulose gel containing 240 pounds of gelling agent per 1000 gallons of fresh water into the sand pack. That is, the aqueous gel was injected into the simulated well bore and against the consolidated sand pack at a rate of 200 milliliters per minute and a pressure sufficient to fracture the sand pack. An examination of the resulting sand pack showed that the sand pack was uniformly consolidated by the epoxy resin composition and that the pore spaces were free of resin. In addition, the sand pack was cleanly fractured.

EXAMPLE 4

An epoxy resin composition of this invention was prepared comprised of 105 milliliters of a multi-functional epoxy novolac resin, 100 milliliters of N-methyl-2-pyrrolidone diluent, 10.5 milliliters of butyl lactate, 41.0 milliliters of 4,4-diaminodiphenylsulfone hardening agent and 3 milliliters of N-beta-aminoethyl-gamma-aminopropyltrimeth-oxysilane coupling agent. A salt solution was prepared for use as a preflush comprised of 1000 milliliters of fresh water, 50 grams of potassium chloride and 2 milliliters of an alkyl phosphonate surfactant. A salt solution was prepared for use as an afterflush comprised of 1000 milliliters of fresh water, 100 grams of sodium chloride, and 1 milliliter of an alkyl phosphonate surfactant.

A 50 gram 20/40 mesh Brady sand pack was treated with 25 milliliters of the above described preflush solution, followed by 10 milliliters of the above described epoxy resin composition, followed by 50 milliliters of the above described afterflush solution. The flow rates of the preflush solution, the epoxy resin solution and the afterflush solution were measured during the test.

The above described test was repeated except that 0.1 grams of particulate solid foamed starch particles were mixed with the 10 milliliters of resin solution prior to its injection. The flow rates of the preflush solution, epoxy resin solution and afterflush solution w ere again measured. The results of these tests are set forth in Table II below.

TABLE II

FLOW TIME TESTS

| Treatment | Preflush Flow Time, Min:Sec | Epoxy Resin Composition Flow Time, Min:Sec | Afterflush Flow Time, Min:Sec |
|---|---|---|---|
| Epoxy Resin Composition without diverting agent[1] | 3:10 | 4:15 | 10:05 |
| Epoxy Resin Composition with diverting agent[1] | 3:20 | 11:45 | 22:09 |

[1]Particulate solid foamed starch

The flow rates given in Table II indicate that the foamed starch particles reduced the flow rate of the resin composition through the core.

The two sand packs were cured for 20 hours at 200° F. in closed glass tubes. An examination of the resulting consolidated cores showed that both were uniformly and smoothly coated with the epoxy resin composition and that the pore spaces were free of resin. Further, the foamed starch particles were removed from the cores by dissolution in the afterflush solution.

Thus, the present invention is well adapted to carry out the objects and advantages mentioned as well as those which are inherent therein. While numerous changes may be made to the invention by those skilled in the art, such changes are encompassed within the spirit of the invention as defined by the appended claims.

What is claimed is:

1. An improved low viscosity hardenable epoxy resin composition for consolidating an unconsolidated subterranean producing zone penetrated by a well bore comprising:

an epoxy resin selected from the group of multifunctional polyepoxides having an epoxide equivalent weight in the range of from about 90 to about 300;

a diluent comprised of N-methyl-2-pyrrolidone present in said composition in an amount sufficient to lower the viscosity thereof to within the range of from about 1 to about 100 centipoises; and an effective amount of a hardening agent.

2. The composition of claim 1 which further comprises an effective amount of a particulate solid diverting agent which can subsequently be removed from said zone.

3. The composition of claim 2 wherein said diverting agent is particulate solid foamed starch which is removed by dissolution in an aqueous solution.

4. The composition of claim 1 wherein said epoxy resin comprises an epoxy novalac resin.

5. The composition of claim 4 wherein said epoxy resin is present in said composition in an amount in the range of from about 5% to about 80% by weight of said composition.

6. The composition of claim 1 wherein said diluent is present in said composition in an amount in the range of from about 25% to about 150% by weight of said composition.

7. The composition of claim 1 wherein said hardening agent is an aromatic amine selected from the group of 4,4-diaminodiphenolsulfone, 3,3-diaminodiphenylsulfone and methylene dianiline and is present in said composition in an amount in the range of from about 20% to about 80% by weight of said composition.

8. The composition of claim 1 which further comprises a resin-to-sand coupling agent selected from the group of gamma-glycidoxypropyltrimethoxysilane, gamma-glycidoxymethyltriethoxysilane and N-beta-aminoethyl-gamma-aminopropyltrimethoxysilane and is present in said composition in an amount in the range of from about 0.1% to about 10% by weight of said composition.

9. An improved low viscosity hardenable epoxy resin composition for consolidating an unconsolidated subterranean producing zone penetrated by a well bore comprising:
a liquid epoxy resin comprising an epoxy novalac resin present in an amount of from about 30% to about 50% by weight of said composition;
a diluent comprised of N-methyl-2-pyrrolidone present in an amount in the range of from about 80% about 125% by weight of said composition;
a hardening agent comprised of 4,4-diaminodiphenylsulfone present in an amount in the range of from about 40% to about 55% by weight of said composition; and
a resin-to-sand coupling agent comprised of N-beta-aminoethyl-gamma-aminopropyltrimethoxysilane present in an amount in the range of from about 0.1% to about 5% by weight of said composition.

10. The composition of claim 9 which further comprises a diverting agent comprised of particulate solid foamed starch present in an amount in the range of from about 0.1% to about 20% by weight of said composition.

11. A method of consolidating an unconsolidated subterranean zone penetrated by a well bore to thereby reduce or prevent the migration of loose and incompetent sands with fluids produced from said zone comprising the steps of:
(a) introducing a low viscosity hardenable epoxy resin composition into said zone whereby said loose and incompetent sands in said zone are coated with said resin composition, said resin composition being comprised of an epoxy resin, a diluent comprised of N-methyl-2-pyrrolidone present in said composition in an amount sufficient to lower the viscosity thereof to within the range of from about 1000 to about 10 centipoises and an effective amount of a hardening agent;
(b) introducing an afterflush solution into said zone to remove excess resin composition from the pore spaces in said zone; and
(c) allowing said epoxy resin composition to harden in said zone.

12. The method of claim 11 wherein said composition further comprises an effective amount of a particulate solid diverting agent which can subsequently be removed from said zone.

13. The method of claim 12 wherein said diverting agent is particulate solid foamed starch.

14. The method of claim 11 wherein said epoxy resin has an epoxide equivalent weight in the range of from about 90 to about 300.

15. The method of claim 14 wherein said epoxy resin is present in said composition in an amount in the range of from about 5% to about 80% by weight of said composition.

16. The method of claim 11 wherein said diluent is present in said composition in an amount in the range of from about 25% to about 150% by weight of said composition.

17. The method of claim 11 wherein said hardening agent is 4,4-diaminodiphenylsulfone and is present in said composition in an amount in the range of from about 20% to about 80% by weight of said composition.

18. The method of claim 11 wherein said composition further comprises a resin-to-sand coupling agent selected from the group of gamma-glycidoxypropyltrimethoxysilane, gamma-glycidoxymethyltriethoxysilane and N-beta-aminoethyl-gamma-aminopropyltrimethoxysilane.

19. The method of claim 11 wherein said coupling agent is present in said composition in an amount in the range of from about 0.1% to about 10% by weight of said composition.

20. The method of claim 13 wherein said afterflush solution is an aqueous salt solution and said particulate solid foamed starch diverting agent is dissolved therein.

21. A method of consolidating and stimulating an unconsolidated subterranean formation penetrated by a well bore to thereby reduce migration of loose and incompetent sands with fluids produced from said formation comprising the steps of:
(a) introducing a low viscosity hardenable epoxy resin composition into said formation whereby said loose and incompetent sands in said formation are coated with said resin composition, said resin composition being comprised of an epoxy resin, a diluent comprised of N-methyl-2-pyrrolidone present in said composition in an amount sufficient to lower the viscosity thereof to within the range of from about 1000 to about 10 centipoises and an effective amount of a hardening agent;
(b) introducing an afterflush solution into said formation to remove excess resin composition from the well bore in said formation;
(c) introducing a fracturing fluid into said formation through said well bore prior to hardening of said hardenable resin composition at a rate and pressure sufficient to create at least one fracture in said subterranean formation;
(d) introducing a propping agent into at least a portion of said created fracture; and,
(e) allowing said epoxy resin composition to harden in said formation to consolidate at least a portion of said loose and incompetent sands.

22. The method of claim 21 wherein said resin composition further comprises an effective amount of a particulate solid diverting agent which can subsequently be removed from said formation.

23. The method of claim 22 wherein said diverting agent is particulate solid foamed starch.

24. The method of claim 21 wherein said propping agent is at least partially coated with a tackifying compound or hardenable resin to reduce proppant flowback upon subsequent production of fluids from the subterranean formation.

* * * * *